(12) United States Patent
Minamibori et al.

(10) Patent No.: US 9,812,678 B2
(45) Date of Patent: *Nov. 7, 2017

(54) MOLDING PACKAGING MATERIAL

(71) Applicant: Showa Denko Packaging Co., Ltd., Isehara-shi, Kanagawa (JP)

(72) Inventors: Yuji Minamibori, Hikone (JP); Honglin Wang, Hikone (JP)

(73) Assignee: SHOWA DENKO PACKAGING CO., LTD., Kanagawa (JP)

( * ) Notice: Subject to any disclaimer, the term of this patent is extended or adjusted under 35 U.S.C. 154(b) by 131 days.

This patent is subject to a terminal disclaimer.

(21) Appl. No.: 14/454,777

(22) Filed: Aug. 8, 2014

(65) Prior Publication Data

US 2015/0044546 A1    Feb. 12, 2015

(30) Foreign Application Priority Data

Aug. 9, 2013 (JP) .................................. 2013-166872

(51) Int. Cl.
*H01M 2/02* (2006.01)
*B32B 15/088* (2006.01)
(Continued)

(52) U.S. Cl.
CPC ............. *H01M 2/0292* (2013.01); *B32B 7/06* (2013.01); *B32B 15/085* (2013.01); *B32B 15/088* (2013.01); *B32B 15/20* (2013.01); *H01M 2/0287* (2013.01); *B32B 2255/10* (2013.01); *B32B 2255/26* (2013.01); *B32B 2307/518* (2013.01); *B32B 2307/714* (2013.01); *B32B 2307/746* (2013.01); *B32B 2323/00* (2013.01); *B32B 2375/00* (2013.01); *B32B 2377/00* (2013.01); *B32B 2439/00* (2013.01); *B32B 2457/10* (2013.01); *Y10T 428/25* (2015.01); *Y10T 428/31544* (2015.04); *Y10T 428/31562* (2015.04)

(58) Field of Classification Search
CPC . H01M 2/0292; H01M 2/0287; B32B 15/095; B32B 15/092; B32B 15/085
See application file for complete search history.

(56) References Cited

U.S. PATENT DOCUMENTS 6,495,266 B1 * 12/2002 Migliorini ............... B32B 27/32
264/173.14
6,514,625 B1 * 2/2003 DeMeuse ................ B32B 27/32
428/220

(Continued)

FOREIGN PATENT DOCUMENTS

CN    102131640 A    7/2011
JP    2000-123799 A   4/2000
(Continued)

*Primary Examiner* — Rena D Cronin
(74) *Attorney, Agent, or Firm* — Keating and Bennett, LLP

(57) ABSTRACT

In some embodiments, a molding packaging material includes an outer side base layer made of a heat resistant resin, an inner sealant layer, a metal foil layer arranged between the outer side base material layer and the inner sealant layer, and a matte coat layer formed on a side opposite to a metal foil layer side of the outer side base material layer. The matte coat layer includes a resin component, a solid fine particle, and a lubricant, and the inner sealant layer includes a thermoplastic resin and a lubricant.

13 Claims, 2 Drawing Sheets

(51) Int. Cl.
  *B32B 15/085* (2006.01)
  *B32B 15/20* (2006.01)
  *B32B 7/06* (2006.01)

(56) References Cited

U.S. PATENT DOCUMENTS

| | | | |
|---|---|---|---|
| 2003/0118750 A1* | 6/2003 | Bourdelais | G02B 5/0242 |
| | | | 428/1.3 |
| 2006/0288648 A1* | 12/2006 | Thurber | B24D 3/28 |
| | | | 51/295 |
| 2008/0038544 A1* | 2/2008 | Kitaike | B29C 45/14811 |
| | | | 428/336 |
| 2010/0326517 A1* | 12/2010 | O'Brien | B29C 47/0021 |
| | | | 136/256 |
| 2010/0331474 A1* | 12/2010 | Vignola | C08L 23/02 |
| | | | 524/502 |
| 2012/0015145 A1* | 1/2012 | Depres | B32B 15/08 |
| | | | 428/143 |
| 2012/0164442 A1 | 6/2012 | Ong et al. | |
| 2012/0244421 A1 | 9/2012 | Yamazaki et al. | |
| 2014/0087241 A1 | 3/2014 | Kuramoto et al. | |
| 2014/0205894 A1 | 7/2014 | Akita et al. | |

FOREIGN PATENT DOCUMENTS

| | | | |
|---|---|---|---|
| JP | 2002-050325 A | 2/2002 | |
| JP | 2002-216714 A | 8/2002 | |
| JP | 2004-327044 A | 11/2004 | |
| JP | 2011-054563 A | 3/2011 | |
| JP | 2012-124067 A | 6/2012 | |
| WO | 2012/133663 A1 | 10/2012 | |

* cited by examiner

MOLDING PACKAGING MATERIAL

BACKGROUND OF THE INVENTION

Field of the Invention

The present invention relates to a molding packaging material preferably used as a case for a lithium ion secondary battery for use in, e.g., laptop computers, mobile phones, automobiles, or for a stationary type lithium ion secondary battery, and also preferably used as a packaging material for, e.g., food products or pharmaceutical products.

Description of the Related Art

The following description sets forth the inventor's knowledge of related art and problems therein and should not be construed as an admission of knowledge in the prior art.

As a molded packaging material, a packaging material in which a metal foil layer as a barrier layer is integrally provided between an outer layer made of a heat resistant resin and an inner layer made of a thermoplastic resin is known (see Patent Documents 1 to 3). Also, Patent Documents 2 and 3 describes that, in a packaging material, by subjecting an outer layer to a matte treatment or by providing a matte coat layer on an outer layer, the moldability and the wear resistance are improved. It is also described that, by forming a matte coat layer, the quality of the outer appearance of the packaging material is improved, and the adhesion of the packaging materials to each other can be prevented, thereby making them easy to handle.

The matte coat layer is made of a resin composite in which solid particles are dispersed in a resin, and as the resin, e.g., an acrylic-based resin, a urethane-based resin, an alkyd-based resin, and a fluorine-based resin are used, and as the solid particles, e.g., silica and kaolin are used.

Also, in deep drawing, since deeper drawing is desired to increase the inner capacity of the case, for the purpose of improving the moldability, a method of coating the surface with a lubricant (Patent Document 4), a method of forming a surface coating agent in which a lubricant is added in advance as an active inducing layer to thereby leach the lubricant (Patent Document 5), and a method in which a lubricant is added to a heat adhesive resin layer (Patent Document 6) are proposed.

PRIOR ART DOCUMENTS

Patent Documents

Patent Document 1: Japanese Unexamined Patent Application Publication No. 2000-123799
Patent Document 3: Japanese Unexamined Patent Application Publication No. 2011-054563
Patent Document 4: Japanese Unexamined Patent Application Publication No. 2002-216714
Patent Document 5: Japanese Unexamined Patent Application Publication No. 2002-050325
Patent Document 6: Japanese Unexamined Patent Application Publication No. 2004-327044

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Resins used for matte coat layers each have characteristics.

Although a urethane-based resin is flexible and provides good moldability, there are problems with chemical resistance and solvent resistance. In a packaging material for a case for secondary batteries, since there is a risk that electrolyte may adhere to the outer layer of the packaging material in the production process of the battery, chemical resistance and solvent resistance are desired for the matte coat layer, which is the outermost layer of the case, to prevent deterioration of the quality of the outer appearance due to the adherence of electrolytes.

Also, although a fluorine-based resin is a resin excellent in chemical resistance and solvent resistance, it is poor in adherence of print ink. Therefore, blurring of words and/or bar codes printed on the surface of the product may occur.

Also, in a process of producing a product in which contents are loaded and sealed in a case, the outermost layer of the packaging material comes into contact with various production equipment, so a problem may occur in which the outermost layer peels off due to the friction against the production equipment.

In view of the aforementioned technical background, some preferred embodiments of the present invention provide a molding packaging material having good slippage, moldability, wear resistance, chemical resistance, solvent resistance, as well as printability, and also provided its related technologies.

That is, some preferred embodiments of the present invention have the structure as described in the following items (1) to (14).

(1) A molding packaging material comprising:
an outer base material layer made of a heat resistant resin;
an inner sealant layer;
a metal foil layer arranged between the outer base material layer and the inner sealant layer; and
a matte coat layer formed on an opposite side of a metal foil layer side of the outer base material layer;
wherein the matte coat layer includes a resin component, a solid particle, and a lubricant; and
wherein the inner sealant layer includes a thermoplastic resin and a lubricant.

(2) The molding packaging material as recited in Item 1, wherein the matte coat layer comprises a resin composition containing a resin component, a solid particle, and a lubricant.

(3) The molding packaging material as recited in Items 1 or 2, wherein a resin component contained in the matte coat layer is at least one of resins selected from the group consisting of an acrylic-based resin, an epoxy-based resin, an urethane-based resin, a polyolefin-based resin, a fluorine-based resin, and a phenoxy resin.

(4) The molding packaging material as recited in Item 3, wherein the fluorine-based resin is a fluorine-based resin having a tetrafluoroethylene or a fluoroethylene vinyl ether as a base.

(5) The molding packaging material as recited in Items 1 or 2, wherein resin components contained in the matte coat layer are a main ingredient resin containing a phenoxy resin and a urethane resin, and a curing agent.

(6) The molding packaging material as recited in Item 5, wherein a mass ratio of the phenoxy resin and the urethane resin in the main ingredient resin is a urethane resin 0.6-1.6 to a phenoxy resin 1.

(7) The molding packaging material as recited in any one of Items 1 to 6, wherein the lubricant contained in the matte coat layer is higher fatty acid amide.

(8) The molding packaging material as recited in any one of Items 1 to 7, wherein an average particle size of solid fine particles contained in the matte coat layer is 1-10 μm.

(9) The molding packaging material as recited in any one of Items 2 to 8, wherein a content rate of the solid fine particles in the resin composition constituting the matte coat layer is 0.1-60 mass %.

(10) The molding packaging material as recited in any one of Items 1 to 9, wherein the inner sealant layer comprises a resin composition containing a thermoplastic resin and a lubricant.

(11) The molding packaging material as recited in any one of Items 1 to 10, wherein the lubricant contained in the inner sealant layer is a higher fatty acid amide.

(12) The molding packaging material as recited in any one of Items 1 to 11, wherein the inner sealant layer further contains one or more solid fine particles selected from the group consisting of an acrylic resin, a silicone resin, a fluoric resin and silica.

(13) A molded case formed by subjecting the molding packaging material as recited in any one of Items 1 to 12 to deep drawing or bulging.

(14) The molded case as recited in Item 13, wherein the molded case is used as a battery case.

According to the embodiment as recited in the aforementioned Item (1), the matte coat layer includes a solid particle and a lubricant, and the inner sealant layer includes a lubricant, both surfaces are excellent in slipping characteristics. For this reason, when forming a molding packaging material, adhesion to a die is prevented and the slidability is enhanced to improve the formability, enabling deep forming. Further, when producing a product by loading a content in a formed case, the slidability at the time of contact to the production facility is enhanced to prevent detachment of the matte coat layer and the inner sealant layer can be prevented, and abrasion of the matte coat layer can be suppressed. Further, by adding the lubricant, chemical resistance, solvent resistance, and printability can be improved.

According to the embodiment as recited in the aforementioned Item (2), an excellent sliding performance can be obtained by the single-layer structured matte coat layer. Further, since the matte coat layer is s single layer, it can be formed at a fewer steps.

According to the embodiment as recited in the aforementioned Item (3), since the resin constituting the matte coat layer is a specific resin, a matte coat layer especially high in chemical resistance, solvent resistance, and printability can be obtained.

According to the embodiment as recited in the aforementioned Item (4), the fluorine-based resin a fluorine-based resin having tetrafluoroethylene or fluoroethylene vinyl ether as a base, a matte coat layer especially high in chemical resistance, solvent resistance, and printability can be obtained.

According to the embodiment as recited in the aforementioned Item (5), in the resin component constituting the matte coat layer, as a main ingredient resin, mixed resins composed of a phnenoxy resin having high stability and a urethane resin having high flexibility is used, and therefore a matte coat layer having chemical resistance, solvent resistance, and printability can be obtained. Also, since both the phenoxy resin and the urethane resin are resins excellent in printability, the matte coat layer can have an excellent printability in addition to the aforementioned characteristics.

According to the embodiment as recited in the aforementioned Item (6), by the mixture ratio of the phenoxy resin and the urethane resin in the main ingredient resin, a matte coat layer especially excellent in balance of formability, chemical resistance, solvent resistance can be obtained.

According to the embodiment as recited in the aforementioned Item (7), since higher fatty acid amid is used as a lubricant, an especially high slipping performance and printing performance can be given to the matte coat layer, and wear resistance of the matte coat layer can be enhanced.

According to the embodiment as recited in the aforementioned Item (8), the grain diameter of solid particles contained in the resin composition is set within the predetermined range, a matte coat layer especially excellent in formability and also excellent in appearance can be obtained.

According to the embodiment as recited in the aforementioned Item (9), the content rate of the solid particles in the resin composition is set within a predetermined range, and therefore a matte coat layer especially excellent in formability and also excellent in appearance can be obtained.

According to the embodiment as recited in the aforementioned Item (10), a single-layer structure inner sealant layer is formed, resulting in good sliding performance. Since the inner sealant layer is a single layer, it can be formed at a fewer steps.

According to the embodiment as recited in the aforementioned Item (11), by using a higher fatty acid amide as a lubricant, especially high formability and printability can be given to a matte coat layer, and wear resistance of the inner sealant layer can be enhanced.

According to the embodiment as recited in the aforementioned Item (12), by containing solid particles in the inner sealant layer, the surface slidability can be further improved. This in turn can further enhance the slidablity to a die at the time of forming the molding packaging material, improving the formability, which in turn enables deeper forming.

According to the embodiment as recited in the aforementioned Item (13), a formed case having formability, chemical resistance, and solvent resistance and also having good printability and wear resistance can be provided.

According to the embodiment as recited in the aforementioned Item (14), a battery case having formability, chemical resistance, and solvent resistance and also having good printability and wear resistance can be provided.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

[Molding Packaging Material]

Figure 1:
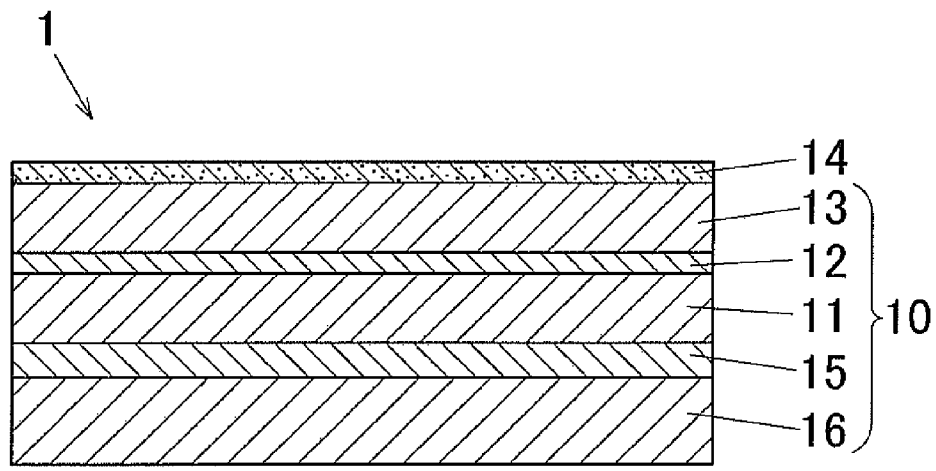
FIG. 1 is a cross-sectional view showing an embodiment of a molding packaging material according to the present invention.

FIG. 1 shows an embodiment of a molding packaging material 1 according to the present invention. The molding packaging material 1 is used as a packaging material for a lithium ion secondary battery case. That is, the molding packaging material 1 is subjected to molding, such as, e.g., deep drawing, to be used as a secondary battery case.

In the molding packaging material 1, an outer base material layer 13 is integrally laminated on one of the surfaces of a metal foil layer 11 via an outer adhesive agent layer 12, and a matte coat layer 14 is formed on the outer surface of the outer base material layer 13, that is, on the opposite side surface of the metal foil layer 11. Also, an inner sealant layer 16 is integrally laminated on the other surface of the metal foil layer 11 via an inner adhesive agent layer 15.

Hereinafter, each layer will be detailed.

(Metal Foil Layer)

The metal foil layer 11 functions to provide gas barrier characteristics for preventing infiltration of oxygen and/or moisture to the molding packaging material 1.

The metal foil layer 11 is not especially limited, but an aluminum foil, a copper foil, and a stainless steel foil, etc., can be exemplified, and an aluminum foil is generally used. It is preferable that the thickness of the metal foil layer 11 is 20 μm to 100 μm. By setting it to 20 μm or more, the generation of pinholes at the time of rolling when producing a metal foil can be prevented, and by setting it to 100 μm or less, the stress at the time of bulging or drawing can be reduced to thereby improve the moldability.

Also, it is preferable that a chemical conversion film is formed on the surface of the metal foil layer 11. The outer layer and the inner layer of the molding packaging material 1 are resin layers, and there is a risk that an infinitesimal amount of light, oxygen and/or liquid may enter from outside the case, and contents (such as, e.g., electrolyte of the battery, food products, and pharmaceutical products) may soak in from the inside. When these intruding objects reach the metal foil layer 11, they become the cause of corrosion of the metal foil layer 11. For the phenomenon, by forming a high corrosive resistant chemical conversion film on the surface of the metal foil layer 11, the corrosive resistance of the metal foil layer 11 can be improved.

The chemical conversion film is a film formed by subjecting the surface of the metal foil to a chemical conversion treatment, and it can be formed, for example, by subjecting the metal foil to a chromate treatment or a non-chromium type chemical conversion treatment using a zirconium compound. For example, in the case of the chromate treatment, any one of the following mixture of aqueous solutions 1) to 3) is applied to the surface of the metal foil after it has been degreased, and dried.

1) a mixture of phosphoric acid, chromic acid, and at least one of metal salt and non-metal salt of fluoride;

2) a mixture of phosphoric acid, either an acrylic resin, a chitosan derivative resin or a phenol resin, and at least one of chromic acid and chromium (III) salt; and 3) a mixture of phosphoric acid, either an acrylic resin, a chitosan derivative resin or a phenol resin, and at least one of chromic acid and chromium (III) salt, and at least one of metal salt and non-metal salt of fluoride.

It is preferable that the chromic adhesion amount of the chemical conversion film is 0.1 to 50 mg/m$^2$, more preferably 2 to 20 mg/m$^2$. A highly corrosive resistant molding packaging material can be obtained by the chemical conversion film having the aforementioned chromic adhesion amount.

(Outer Base Material Layer)

The outer base material layer 13 is made of a heat resistant resin, and although the type of the resin is not especially limited, e.g., a polyamide film and a polyester film can be exemplified, and these stretched films are preferably used. Among them, for moldability and strength, it is preferable to use a biaxially stretched polyamide film, a biaxially stretched polybutylene terephthalate (PBT) film, a biaxially stretched polyethylene terephthalate (PET) film or a biaxially stretched polyethylene naphthalate (PEN) film. The polyamide film is not especially limited, but for example, nylon 6 film, a nylon 6,6 film, and a MXD nylon film can be exemplified. Also, the outer base material layer 13 can be formed as a single-layer or, for example, a multi-layer made of PET film/polyamide film.

It is preferable that the thickness of the outer base material layer 13 is 9 μm to 50 μm. When using a polyester film, it is preferable that the thickness is 9 μm to 50 μm, and when using a polyamide film, it is preferable that the thickness is 10 μm to 50 μm. By setting it to the suitable lower limit or over, sufficient strength can be secured as a packaging material, and by setting it to the suitable upper limit or under, the stress at the time of bulging or drawing can be decreased to thereby improve the formability.

(Matte Coat Layer)

The matte coat layer 14 is formed on the outer surface of the outer base material layer 13, and is a layer that provides good slippage to the surface of the molding packaging material 1 and improves the moldability, as well as good chemical resistance, solvent resistance, wear-resistance, and printability. The matte coat layer 14 includes a resin component, a solid particle and a lubricant.

As methods of including the lubricant to the matte coat layer 14, a method of adding the lubricant to the resin composition constituting the matte coat layer 14 and a method of forming a base layer not including the lubricant with the resin composition including the resin component and solid particles and applying and drying a lubricant solution in which the lubricant is dissolved in a solvent to the surface of the base layer. According to the former method, a single-layer matte coat layer 14 as shown in FIG. 1, in which the lubricant is distributed evenly in the layer, is formed. Also, since it is a single layer, an expected matte coat layer 14 can be formed with a fewer steps. According to the latter method, a two-layer structure matte coat layer 17 in which a lubricant layer 17b is laminated on the surface of the base layer 17a including solid particles but not the lubricant can be formed, as shown in the molding packaging material 2 in FIG. 2.

The resin component, solid particles and the lubricant that constitutes the matte coat layer are common to the aforementioned layer structures, and the preferred component is as follows.

As the resin component, it is preferable to use at least one type of resin among an acrylic-based resin, an epoxy-based resin, a urethane-based resin, a polyolefin-based resin, a fluorine-based resin, and a phenoxy resin. These resins have high corrosive resistance, solvent resistance, and excellent printability. Also, although a fluorine-based resin generally is poor in printability, since the printability is improved by including a lubricant, it can be used as a resin for matte coat layers, taking advantage of the good chemical resistance and the solvent resistance of the fluorine-based resin.

Also, as the fluorine-based resin, it is preferable to use a fluorine-based resin having tetrafluoroethylene or fluoroethylene vinyl ether as a base. These resins are especially high in chemical resistance, solvent resistance and wear-resistance among the fluorine-based resins.

Also, the resin component can be a main ingredient resin including a phenoxy resin and a urethane resin and a curing agent for hardening the main ingredient resin.

In the main ingredient resin, the urethane resin is flexible and has good moldability, but on the other hand, it does not have sufficient chemical resistance and solvent resistance. On the other hand, the phenoxy resin is a tough and stable linear polymer synthesized by bisphenol and epichlorohydrin, having good thermostability in a wide range of processing temperatures. In addition, since OH group is included in the structure, the resin has even better adhesiveness and chemical resistance by cross-linking. Although the phenoxy resin having the characteristics has good chemical resistance and solvent resistance, it is inferior to the urethane resin in flexibility. In the present invention, by mixing two types of resins having contrary characteristics, that is, a urethane resin having high flexibility and a phenoxy resin having high chemical resistance and solvent resistance, and using it as a main ingredient resin, a resin compound having moldability, chemical resistance, and solvent resistance can be obtained. In addition, the phenoxy resin can be a bisphenol A-type phenoxy resin or a bisphenol F-type phenoxy resin, and although they can be used simultaneously, a bisphenol A-type phenoxy resin can be recommended for its excellent solvent resistance.

Also, since the urethane resin is extremely good in printability and the phenoxy resin is also good in printability, their mixed resin is also good in printability.

Although the moldability of the main ingredient resin improves as the content rate of urethane resin increases since flexibility increases, the content rate of the phenoxy resin decreases relatively, decreasing the chemical resistance and the solvent resistance. On the other hand, as the content rate of the phenoxy resin increases, the chemical resistance and the solvent resistance improve, but since the content rate of the urethane resin decreases relatively, the degree of improvement of the moldability becomes small. Although the mixture ratio of the main ingredient resin in the present invention is not limited, as a well-balanced mixture ratio of the moldability, chemical resistance, and solvent resistance, a mass ratio in the range of urethane resin 0.6 to 1.6 to phenoxy resin 1 can be recommended. An especially preferable mass ratio is in a range of urethane resin 0.8 to 1.4 to phenoxy resin 1.

Also, although the curing agent is not especially limited, it is preferable that an isocyanate component is used. As the isocyanate component, diisocyanate, such as, e.g., TDI (tolylene diisocyanate), HDI (hexamethylene diisocyanate) and MDI (methylene bis (4,1-phenylene) diisocyanate) can be exemplified, and a mixture of one, two or more types can be used.

For the curing agent, 5 to 30 mass parts is preferably combined for 100 mass parts of the main ingredient resin. If it is less than 5 mass parts, the adhesiveness to the outer base material layer 13 and solvent resistance may decrease. If it exceeds 30 mass parts, the matte coat layer 14 and 17 hardens, which in turn decreases the printability and moldability. An especially preferable compounded amount of the curing agent is 10 to 20 mass parts to 100 mass parts of the main ingredient resin.

Also, as the property of the resin component consisting of the main ingredient resin and the curing agent, it is preferable that the viscosity is in a range of 10 to 30 seconds when a solution having a solid content concentration of 25 mass % is measured at 20° C. using a Zahn cup #4, and a range of 15 to 25 seconds is especially preferable.

The solid particles are components added to provide a slipping performance to the matte coat layer 14 and 17 to improve the moldability. Also, by adding the solid particles, handling becomes easy since the packaging materials are less likely to stick to each other, thereby suppressing the glossiness of resin and creating an effect of a calm outer appearance.

As the solid particles exerting the effects, any inorganic fine particle or organic fine particle can be used or they can be mixed. As the inorganic fine particles, one, two or more types of, e.g., silica, alumina, calcium oxide, calcium carbonate, calcium sulphate, calcium silicate, and carbon black can be used, but among them, silica is preferred. Also, as the organic fine particles, fine particles such as acrylic ester-based compound, polystyrene-based compound, polyamide-based compound, or their cross-linked composition can be used.

For these fine particles, it is preferable that the average grain diameter is 1 μm to 10 μm to be able to obtain good slipping performance, and 2 μm to 5 μm is especially preferred. When using fine particles having a grain diameter under 1 μm that is too small, since they get buried in the coating solution and requires the addition of a large amount of fine particles to obtain the desired characteristics, sufficient slipping performance is hard to obtain. On the other hand, when using fine particles having large grain diameters exceeding 10 μm, the grain diameter exceeds the thickness of the coating, so they are likely to fall off.

Also, the content rate of the solid fine particles in the resin composition is arbitrarily determined within the range of 0.1 to 60 mass % according to the degree of slippage desired from the packaging material, the grain diameter and the type of the added fine particles. When the content rate is below 0.1 mass %, the effect of the improvement of the slippage is small, and there is a risk that the effect of the improvement of the moldability cannot be sufficiently obtained. On the other hand, if it is contained too much, exceeding 60 mass %, there is a risk that the outer appearance is spoiled. The preferred range of the content rate of the fine particles is within 5 to 55 mass %, and an especially preferable range is 20 to 50 mass %. When using silica, for example, as inorganic fine particles, since the grain diameter and the content rate is within the upper and lower limit, the optimal slippage can be provided. In addition, the preferred range of the content rate of the solid fine particles is the same for the resin composition for a single-layer matte coat layer 14 containing the lubricant and the resin composition for the base layer 17a of the two-layer structure matte coat layer 17 not containing the lubricant.

The lubricant is added to improve the slippage of the surface of the matte coat layer 14 and 17. When the molding packaging material 1 is formed by adding the lubricant, the adherence to the metal mold is prevented while the moldability is improved by increasing the sliding characteristics to thereby allow deep processing. Also, when producing a product by loading contents into a molded case, the sliding characteristics at the time of contacting the production equipment are enhanced to thereby prevent the detachment of the matte coat layer 14 and 17 due to friction. For example, in the production process of a lithium ion secondary battery, e.g., the loading of the battery main body portion into the case, the injection of electrolyte, and the sealing of the case, the molding packaging material 1 comes into contact with the production equipment in each step, but by increasing the sliding characteristic at the time of contact, the detachment of the matte coat layer 14 and 17 due to friction can be prevented, and the wearing down of the matte coat layer 14 and 17 can be controlled. Furthermore, by adding the lubricant, the chemical resistance, the solvent resistance, and printability are improved.

As the lubricant, e.g., hydrocarbon-based lubricants such as liquid paraffin, fatty acid based lubricant such as stearic acid, higher fatty acid amide such as stearylamid, metal soap, natural wax and silicon are preferred. A higher fatty acid amide is especially preferred, since especially high slippage and printability can be provided for the matte coat layer 14 and 17, and the wear resistance of the matte coat layer 14 and 17 can be increased. As specific examples of the higher fatty acid amide, e.g., erucic acid amide, oleic acid amide, lauryl acid amide, palmitic acid amide, stearic acid amide, ethylene bis-erucic acid amide, hexamethylene bis-oleic acid amide, ethylene bis-oleic acid amide, N,N'-dioleyl adipic acid amide, N,N'-dioleyl sebacic acid amide can be exemplified.

The content of the lubricant in the matte coat layer is not especially limited, but the preferable content is as follows.

When adding the lubricant to a resin composition, that is, for a single-layer structure matte coat layer 14 shown in FIG. 1, the lubricant content rate in the resin composition is preferred to be within the range of 1,000 to 20,000 ppm. If the content rate of the lubricant is below 1,000 ppm, the effect of the improvement of the slippage is small, so the moldability improvement effect is small. Also, if it is below 1,000 ppm, the effect of the improvement of the chemical resistance, the solvent resistance, and printability is small. On the other hand, since sufficient slippage can be obtained by adding 20,000 ppm, it is unnecessary to add more than 20,000 ppm. An excessive amount of addition of the lubricant can be a cause of the decrease in the mechanical strength of the matte coat layer and the quality of the outer appearance due to the effusion of the lubricant to the surface, but there are no such concerns if the amount is 20,000 ppm or lower. Also, the moldability improvement effect can be obtained with a comparatively low content rate of lubricant, but to sufficiently improve the wear resistance, it is preferable to increase the lubricant addition amount so that the lubricant content rate is 5,000 ppm or more. An especially preferable lubricant content rate in the resin composition is 6,000 to 18,000 ppm, and a further preferable range is 7,500 to 15,000 ppm. The lubricant is dispersed in the resin composition, but it leaches out to the surface of the matte coat layer 14, providing good slippage, moldability, wear resistance, chemical resistance, solvent resistance and printability to the layer.

Figure 2:
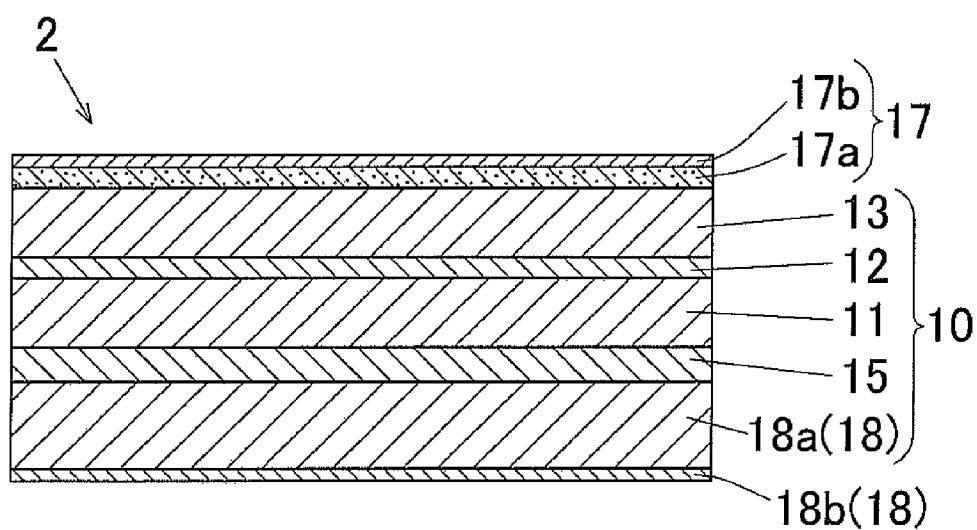
FIG. 2 is a cross-sectional view showing another embodiment of a molding packaging material according to the present invention.

When providing the lubricant as the lubricant layer, that is, in the case of a two-layer structure matte coat layer 17 having a base layer 17a and a lubricant layer 17b as shown in FIG. 2, the adhesion amount of the lubricant is preferred to be in the range of 2 to 30 µg/m².

In addition, the present invention does not eliminate components other than the aforementioned resin components, solid fine particles, and lubricants as the component of the matte coat layer, and the addition of other components is allowed unless the characteristics of the matte coat layer is lost.

It is preferable that the thickness of the matte coat layer 14 and 17 after hardening is 1 to 10 µm. In a layer thinner than the lower limit value, the slippage improvement effect is small, and in a layer thicker than the upper limit value, the cost increases. An especially preferable thickness is in a range of 2 to 5 µm. The range of the thickness is the same for the single-layer structure matte coat layer 14 and the two-layer structure matte coat layer 17.

(Inner Sealant Layer)

The inner sealant layer 16 is provided with good chemical resistance against highly corrosive electrolyte used for lithium ion secondary batteries, and functions to provide heat sealing characteristics to the molding packaging material. The inner sealant layer 16 contains a thermoplastic resin and a lubricant as essential components, and contains certain solid fine particles as arbitrary components.

As the methods to include the lubricant in the inner sealant layer 16, similarly to the aforementioned matte coat layer 14, a method of forming a single-layer structure inner sealant layer 16 with a resin composition including a thermoplastic resin and a lubricant and a method of forming a two-layer structure inner sealant layer 18 by forming a base layer 18a with a thermoplastic resin as shown in FIG. 2 and forming a lubricant layer 18b by applying and drying a lubricant layer in which the lubricant is dissolved in a solvent to the surface of the base layer 18a, can be exemplified.

The thermoplastic resin and the lubricant constituting the inner sealant layer are common to the aforementioned layer structures, and the preferred component is as follows.

The thermoplastic resin is not especially limited, but for the chemical resistance and the heat sealing characteristics, it is preferable to use at least one type of a thermoplastic resin selected from the group consisting of polyethylene, polypropylene, olefin copolymer, and the acid modified substances and ionomers thereof, and it is preferable to be an unstretched film constituted by these resins.

The lubricant is added to improve the slippage of the surfaces of the inner sealant layers 16 and 18. By adding the lubricant, when the molding packaging material 1 is formed, the adherence to the metal mold is prevented while the moldability is improved by increasing the sliding characteristics to thereby allow deep processing. As the lubricant, e.g., hydrocarbon lubricants such as liquid paraffin, higher fatty acid based lubricant such as stearic acid, higher fatty acid amide, metal soap, natural wax and silicon are preferred. A higher fatty acid amide is especially preferred, since especially high slippage and printability can be provided for the inner sealant layers 16 and 18, and the wear resistance of the inner sealant layer 16 and 18 can be increased. As specific examples of the higher fatty acid amide, e.g., erucic acid amide, oleic acid amide, lauryl acid amide, palmitic acid amide, stearic acid amide, ethylene bis-erucic acid amide, and ethylene bis-oleic acid amide, can be exemplified.

The content of the lubricant in the inner sealant layer is not especially limited, but the preferable content is as follows.

When adding the lubricant to a resin composition, that is, for a single-layer structure inner sealant layer 16 as shown in FIG. 1, the lubricant content rate in the resin composition containing the thermoplastic resin and the lubricant is preferred to be within the range of 500 to 5,000 ppm. If the content rate of the lubricant is below 500 ppm, the effect of the improvement of the slippage is small, so the moldability improvement effect is small. On the other hand, since sufficient slippage can be obtained by adding 5,000 ppm, it is unnecessary to add more than 5,000 ppm. Adding an excessive amount of the lubricant can be a cause of the decrease in the mechanical strength of the inner sealant layer 16 and in the heat sealing characteristics, but there are no such concerns if the amount is 5,000 ppm or lower. An especially preferable lubricant content rate in the resin composition is 800 to 3,000 ppm, and a further preferable range is 1,000 to 2,000 ppm. The lubricant is dispersed in the resin composition, but it leaches out to the surface of the inner sealant layer 16, providing good slippage, moldability, wear resistance, chemical resistance, solvent resistance and printability to the inner sealant layer 16. When a trace amount of the lubricant in the resin composition leaches out to the surface, the slippage is improved. Also, since a trace amount of the lubricant actually leaches out, it does not negatively affect the contents.

In the molding packaging material 1 of the present invention, the lubricant is added to both the inner sealant layer 16 and the matte coat layer 14, but the preferred lubricant content rate is higher for the matte coat layer 14 than the inner sealant layer 16. This is because, although slippage from the lubricant is obtained by the lubricant leaching out to the surface and forming a thin layer, but since the degree of the ease for the lubricant to leach out differs in resins, more lubricant must be added for resins in which the lubricant is less likely to leach out. In a polyolefin resin such as a polypropylene and a polyethylene constituting the inner sealant layer 16, it is comparatively harder for the lubricant such as a higher fatty acid amide to dissolve and since the lubricant can easily leach out to the surface, the content rate is low. On the other hand, in a phenoxy resin, a urethane resin, and an acrylic resin constituting the matte coat layer 14, since it is comparatively easy for the lubricant such as a higher fatty acid amide to dissolve and since it is difficult for the lubricant to leach out to the surface, the content rate is high.

When producing the inner sealant layer 16 as a film containing the lubricant at the aforementioned content rate, a method in which the lubricant is directly added to the resin to produce a resin composite including the lubricant at a desired content rate, and the resin composition is made into a film using a film forming device. Also, a high content rate resin composition in which a high content rate of the lubricant is added in advance can be prepared to blend the high content rate resin composition and a resin to produce a resin composition including the desired content rate of the lubricant to make the resin composition into a film using a film forming device.

When providing the lubricant as the lubricant layer, that is, in the case of a two-layer structure inner sealant layer 18 having a base layer 18*a* and a lubricant layer 18*b* as shown in FIG. 2, the adhesion amount of the lubricant is preferred to be in the range of 1 to 20 $\mu g/m^2$.

It is preferable that the inner sealant layer 16 and 18 contains one, two or more types of solid fine particles selected from the group consisting of acrylic resin, silicone resin, fluorine resin, and silica. When these solid fine particles are included in the inner sealant layer 16 and 18, the sliding characteristics of the molding packaging material and the metal mold can be increased at the time of molding, thereby improving the moldability of the molding packaging material. To improve the moldability of the molding packaging material, it is preferable that the solid fine particle content rate in the resin composition constituting the inner sealant layer 16 and 18 is in a range of 0.05 to 1 mass %, and it is even more preferable to be in a rage of 0.1 to 0.5 mass %. Also, it is preferable that the average grain diameter of the solid fine particles is in a range of 0.5 $\mu$m to 10 $\mu$m, and a range of 1 to 5 $\mu$m is even more preferable.

When the inner sealant layer 16 and 18 contains solid fine particles, the dynamic friction coefficient of the surface of the inner sealant layer 16 and 18 (measured by the method according to JIS K7125) can be 0.3 or lower. When fine particles are included along with the lubricant, subtle irregularities can be formed on the surface of the inner sealant layer 16 and 18, more effectively decreasing the dynamic friction coefficient. Since the contact surface of the molding packaging material and the metal mold can be decreased at the time of molding, the sliding characteristics can be increased to thereby improve the moldability of the molding packaging material.

Also, in the case of the single-layer structure inner sealant layer 16 as shown in FIG. 1, the solid fine particles are added to the resin composition for the inner sealant layer along with the lubricant. Also, in the case of a two-layer structure inner sealant layer 18 as shown in FIG. 2, it is added to the base layer 18*a*.

It is preferable that the thickness of the inner sealant layer 16 is set to 20 $\mu$m to 80 $\mu$m. Setting it at 20 $\mu$m or more sufficiently prevents the generation of pinholes and setting it at 80 $\mu$m or less reduces the amount of resin to be used, enabling cost reduction. Above all, it is especially preferable that the thickness of the inner sealant layer 16 is set to 30 $\mu$m to 50 $\mu$m. The range of the thickness is the same for the single-layer structure inner sealant layer 16 and the two-layer structure inner sealant layer 18.

(Outer Adhesive Agent Layer)

The outer adhesive agent layer 12 is a layer for joining the metal foil layer 11 and the outer base material layer 13.

The adhesive agent constituting the outer adhesive agent layer 12 is not especially limited, but, a two-part curing type urethane-based adhesive agent constituting, etc., containing, for example, a polyol component and an isocyanate component, can be exemplified. This two-part curing type urethane-based adhesive agent can be suitably used at the time of adhering especially by a dry lamination method. The composition of polyol is not especially limited, but for example, polyester polyol, polyether polyol, etc., can be exemplified. The isocyanate component is not especially limited, but diisocyanate group such as, for example, TDI (tolylene diisocyanate), HDI (hexamethylene diisocyanate), MDI (methylene bis (4,1-phenylene) diisocyanate) can be exemplified. It is preferable that the thickness of the outer adhesive agent layer 12 is set to 2 $\mu$m to 5 $\mu$m, and above all, especially preferably set to 3 $\mu$m to 4 $\mu$m.

Also, in the outer adhesive agent layer 12, if it is within a range that does not interfere with the effects of the present invention, an anti-blocking agent of inorganic systems and organic systems, and an amide-based slip agent can be added to the resin.

(Inner Adhesive Agent Layer)

The inner adhesive agent layer 15 is a layer for joining the metal foil layer 11 and the inner sealant layer 16 and 18.

The inner adhesive agent layer 15 is not especially limited, but for example, an adhesive agent layer formed by a polyurethane based adhesive agent, an acrylic based adhesive agent, an epoxy based adhesive agent, a polyolefin based adhesive agent, an elastomer based adhesive agent, a fluorine based adhesive agent, and an acid modified propylene adhesive agent can be exemplified. Above all, it is preferable to use an acrylic based adhesive agent or a polyolefin based adhesive agent, and in this case, the anti-electrolyte resistance and vapor barrier performance of the packaging material 1 can be improved.

(Production of the Molding Packaging Material)

The following is an explanation of the production method of the molding packaging material 1 shown in FIG. 1. The matte coat layer 14 and the inner sealant layer 16 of the molding packaging material 1 are single-layer structures. Therefore, the resin composition for the matte coat layer is a mixture containing a resin component, solid fine particles and a lubricant. Also, the inner sealant layer 16 is a single-layer film in which a resin composition containing a thermoplastic resin, a lubricant, or further solid fine particles is film deposited.

The molding packaging material 1 having each of the aforementioned layers can be formed by pasting the outer base material layer 13 on one of the surfaces of the metal foil layer 11 via the outer adhesive agent layer 12, and pasting the inner sealant layer 16 to the other of the surfaces via the inner adhesive agent layer 15 to produce a five-layer laminated body 10, then applying the resin composition for the matte coat layer 14 in a paste state to the surface of the outer base material layer 13 of the laminated body 10 and then drying it.

The method of pasting each of the layers in the production of the laminated body 10 is not limited, but a method called dry lamination can be exemplified. Specifically, an adhesive agent of the outer adhesive agent layer 12 is applied to the upper surface of the metal foil layer 11 or the lower surface of the outer base material layer 13 or both of these surfaces and after the solvent is evaporated and becomes a dry film, the metal foil layer 11 and the outer base material layer 13 are pasted. The pasting of the metal foil layer 11 and the inner sealant layer 16 is performed in a similar manner, in which an adhesive agent of the inner adhesive agent layer 15 is applied to the lower surface of the metal foil layer 11 or the upper surface of the inner sealant layer 16 or both of these surfaces and after the solvent is evaporated and becomes a dry film, the metal foil layer 11 and the inner sealant layer 16 are pasted. Furthermore, by performing hardening according to the hardening conditions of the adhesive agent, a five-layer laminated body 10 is produced. Also, in accordance with a T-die method, the outer base material layer 13 and the outer adhesive agent layer 12, and the inner sealant layer 16 and the inner adhesive agent layer 15 can be extruded as laminated films, and the laminated body 10 can be produced by subjecting these laminated films to thermocompression to the metal foil layer 11. Also, both surfaces of the metal foil layer 11 can be pasted using different methods.

On the other hand, as the material for the matte coat layer 14, a resin composition in a paste state including a resin component, solid fine particles and a lubricant is prepared.

Then, the resin composition is applied to the surface of the outer base material layer 13 of the laminated body 10 and then dried. The application method of the resin composition is not limited, but for example, a gravure roll method can be exemplified. By drying the resin composition, the matte coat layer 14 is formed and the matte coat layer 14 is joined to the outer base material layer 13, and therefore, the desired molding packaging material 1 is produced.

Figure 3:
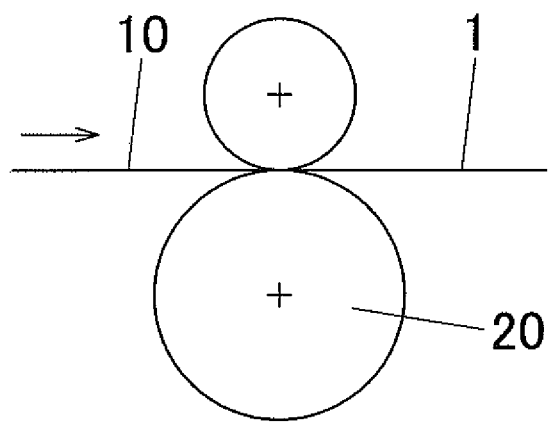
FIG. 3 is a schematic explanatory view showing a production method of a molding packaging material according to the present invention.

As the method for drying the applied resin composition for the matte coat layer, as shown in FIG. 3, a method in which the laminated body 10 in which the resin composition is applied is heated by a heat roll 20 while passing between rolls can be exemplified. In this method, the roll that comes into contact with the resin composition is the heat roll 20, and the roll temperature is heated to 130 to 220° C., for example.

Also, when forming a two-layer structure matte coat layer 17 as shown in FIG. 2, a resin composition not including a lubricant is applied to the surface of the outer base material layer 13 of the laminated body 10 to form the base layer 17a, and the lubricant is applied to the surface of the base layer 17a and then dried to form the lubricant layer 17b. Also, when forming a two-layer structure inner sealant layer 18, the laminated body 10 is produced using a thermoplastic resin film not including a lubricant as the base layer 18a, and a lubricant is applied to the surface of the heat base layer 18a and dried thereafter to form the lubricant layer 18b.

In the molding packaging material of the present invention, the pasting method for each layer and the forming method of the matte coat layer are not limited to the aforementioned methods and the processes, and the present invention includes cases in which other methods and processes are used for production.

In the molding packaging material of the present invention, the matte coat layer includes solid fine particles and a lubricant, and the inner layer side sealant layer includes a lubricant, and therefore, both surfaces have good slippage. Therefore, when the molding packaging material is formed, the adherence to the metal mold is prevented while the moldability is improved by increasing the sliding characteristics to thereby allow deep processing. Also, when producing a product by loading contents into a molded case, the sliding characteristics at the time of contacting the production equipment is increased to thereby prevent the detachment of the matte coat layer and the inner sealant layer from friction, and the wearing down of the matte coat layer can be suppressed.

Furthermore, by adding the lubricant, the chemical resistance, the solvent resistance, and printability are improved.

[Molded Case]

A molded case (battery case, etc.) can be obtained by molding (deep drawing, bulging, etc.) the molding packaging material 1 of the present invention.

EXAMPLES

Next, specific examples of the present invention will be explained, but it should be understood that the present invention is not limited to these examples.

The molding packaging material 1 having a laminated structure as shown in FIG. 1 was produced.

The molding packaging materials of Examples 1 to 8 and Comparative Examples 1 to 3 had the metal foil layer 11, the outer base material layer 13, the outer adhesive agent layer 12 and the inner adhesive agent layer 15 in common, and the ingredients for the matte coat layer 14 and the inner sealant layer 16 were different.

(Common Ingredients)

The metal foil layer 11 was an aluminum foil having a thickness of 35 μm, and a chemical conversion solution including polyacrylic acid, a trivalent chrome compound, water and alcohol was applied to both sides of the aluminum foil and dried thereafter at 180° C. to form a chemical conversion film. The chromic adhesion amount from the chemical conversion film was 10 mg/m$^2$.

The outer base material layer 13 was a biaxially stretched nylon 6 film having a thickness of 15 μm.

The outer adhesive agent layer 12 was a two-part curing type urethane series adhesive agent.

The inner adhesive agent layer 15 was a maleic acid modified polypropylene resin having adhesive properties for both the metal foil layer 11 and polypropylene.

(Matte Coat Layer)

In Examples 1-7, 9, 10, and Comparative Example 2, the phnoxy resin and the urethane resin were mixed at a mass ratio of 1:0.8 as a main ingredient resin, and tolylene diisocyanate (TDI) and hexamethylene diisocyanate (HDI) were mixed at a mass ratio of 1:1 as a curing agent, and 15 mass parts of the curing agent were compounded to 100 mass parts of the main ingredient resin to form the resin composition. Then, 20 mass % of silica having an average grain diameter of 2 μm as solid fine particles and ethylene bis erucic acid amide as a lubricant were added to the resin component at the content rate as shown in Table 1 in an evenly dispersed manner to prepare the resin composition for matte coat.

In Example 8, a copolymer of tetrafluoroethylene and vinyl acetate was used as the main ingredient resin, and in the resin component, 10 mass parts of the curing agent was compounded for 100 mass parts of the main ingredient resin. Then, 20 mass % of silica having an average grain diameter of 2 μm as solid fine particles and ethylene bis-oleic acid amide as a lubricant were added to the resin component at the content rate as shown in Table 1 in an evenly dispersed manner to prepare the resin composition for matte coat.

For Comparative Examples 1 and 3, except that a lubricant was not added, the resin compositions for matte coat layers having the same composition as Example 1, etc., were used.

(Inner Sealant Layer)

In Examples 1 to 8 and Comparative Examples 1 and 2, 1,500 ppm of silica having an average grain diameter of 2 μm and erucic acid amide as an lubricant at an amount as shown in Table 1 were added to an ethylene-propylene random copolymer resin having a melting point of 140° C. and MFR of 7 g/10 min to thereby form a resin composition for the inner sealant layer.

For Comparative Example 3, except that a lubricant was not added, the resin compositions for inner sealant layers having the same composition as Example 1, etc., were used.

(Production of the Molding Packaging Material)

The molding packaging material 1 was produced using the aforementioned materials. The production processes were the same for each of the examples and were as follows.

The outer base material layer 13 was dry laminated onto one of the surface of the metal foil layer 11 using the outer adhesive agent layer 12.

On the other hand, using the resin composition for the inner sealant layer and the adhesive agent for the inner adhesive agent layer 15 and using the T-die method, a laminated film in which the inner sealant layer 16 having a thickness of 28 μm and the inner adhesive agent layer 15 having a thickness of 7 μm was extruded.

Next, on the other of the surfaces of the metal foil layer 11, the inner adhesive agent layer 15 of the laminated film was superposed and the heat roll heated to 150° C. was passed thereafter to obtain the laminated body 10.

Furthermore, the prepared resin composition for the matte coat layer was applied to the surface of the outer base material layer 13 of the laminated body 10 by a gravure roll and dried thereafter to form the matte coat layer 14. The thickness of the matte coat layer 14 after drying was 3 μm. The molding packaging material 1 was obtained in this way.

Each of the molding packaging material obtained in the aforementioned manner was evaluated based on the following evaluation method. The results are shown in Tables 1.

[Moldability Evaluation Method]

The molding packaging material was subjected to bulging into a cuboid shape of length 55 mm×width 35 mm×depth 8 mm using a bulging device made by Amada, Co. Ltd. (Product No.: TP-25C-X2), and pinholes and breakage at a corner R portion of the product was observed and the moldability was evaluated based on the following evaluation standard.

(Evaluation Standard)

"⊚" . . . there were no pinholes and breakage did not occur at all

"○" . . . there were no pinholes, but the matte coat layer was slightly clouded

"Δ" . . . although a slight number of pinholes generated at one portion, there were essentially none "X" . . . pinholes and breakage occurred at the corner R portion <Solvent Resistance Evaluation Method>

The molding packaging material was cut into 10 cm×10 cm pieces and used as test pieces. After 1 ml of ethanol was dropped on the matte coat layer 14 and the inner sealant layer 16 of the test piece, the portion in which the droplet adhered to was rubbed back and forth for a maximum of 10 times with a slide tool in which cotton is wound to a weight having a tip portion having a diameter of 1 cm and weighing 1 kg, and the solvent resistance was evaluated by visual observation of the outer appearance.

(Evaluation Standard)

"⊚" . . . there were no changes in the outer appearance after 10 rubs back and forth "○" . . . there was a change in the outer appearance after 8 rubs back and forth "Δ" . . . there was a change in the outer appearance after 5 rubs back and forth "X" . . . there was a change in the outer appearance after 1 rub back and forth <Wear Resistance Evaluation Method>

The molding packaging material was cut into 5 cm×200 cm pieces and used as test pieces. A No. 800 sand paper cut into short 8 mm strips were wound to a hammer having a tip end portion diameter of 10 mm and weighing 200 g in the sliding direction so that the sliding width is 8 mm as a slide tool and the matte coat layer 14 and the inner sealant layer 16 of the test piece were rubbed 50 times back and forth and the wear resistance was evaluated by visually observing the outer appearance.

(Evaluation Standard)

"⊚" . . . the matte coat layer did not detach

"○" . . . the detachment of the matte coat layer did not reach the nylon layer

"Δ" . . . the detachment of the matte coat layer did not reach the nylon layer, but peeled deeper than ○

"X" . . . the detachment of the matte coat layer reached the nylon layer

<Printability Evaluation Method>

Using an inkjet printer, a bar code was printed on a surface of the matte coat layer 14 in white ink. The dot size of the printed inkjet had a diameter of 0.428 mm, and the measurement of the bar code was 4.5 mm×3.5 mm. Whether or not the bar code was readable by a bar code reader was determined and the existence of blotting of dots and lines were examined visually for evaluation.

(Evaluation Standard)
"⊚" . . . Readable. No blotting. Dots are not connected.
"○" . . . Readable. Slight blotting exists, but dots are not connected.
"Δ" . . . Readable. Blotting exists, but dots are not connected.
"X" . . . Not readable. Blotting exists. Dots are connected.

TABLE 1

| | Matte coat layer (silica: 20 mass % in common) | | | Inner sealant layer (silica: 1500 ppm in common) | | Evaluation Result | | | | | |
|---|---|---|---|---|---|---|---|---|---|---|---|
| | | Lubricant | | Lubricant | | | Solvent Resistance | | Wear Resistance | | |
| | | | | | Content | Mold- | Matte coat | Inner sealant | Matte coat | Inner sealant | Print- |
| | Resin | Type | Content Rate (ppm) | Type | Rate (ppm) | ability | layer | layer | layer | layer | ability |
| Comp. Ex. 1 | Phenoxy | Ethylene bis erucic acid amide | 0 | Erucic acid amide | 1,000 | ○ | ⊚ | ⊚ | X | ○ | Δ |
| Ex. 1 | Phenoxy | Ethylene bis erucic acid amide | 1,000 | Erucic acid amide | 1,000 | ○ | ⊚ | ⊚ | Δ | ○ | ○ |
| Ex. 2 | Phenoxy | Ethylene bis erucic acid amide | 2,500 | Erucic acid amide | 1,000 | ○ | ⊚ | ⊚ | Δ | ○ | ○ |
| Ex. 3 | Phenoxy | Ethylene bis erucic acid amide | 5,000 | Erucic acid amide | 1,000 | ○ | ⊚ | ⊚ | ○ | ○ | ○ |
| Ex. 4 | Phenoxy | Ethylene bis erucic acid amide | 7,500 | Erucic acid amide | 1,000 | ⊚ | ⊚ | ⊚ | ⊚ | ○ | ○ |
| Ex. 5 | Phenoxy | Ethylene bis erucic acid amide | 10,000 | Erucic acid amide | 1,000 | ⊚ | ⊚ | ⊚ | ⊚ | ○ | ○ |
| Ex. 6 | Phenoxy | Ethylene bis erucic acid amide | 12,500 | Erucic acid amide | 1,000 | ⊚ | ⊚ | ⊚ | ⊚ | ○ | ○ |
| Ex. 7 | Phenoxy | Ethylene bis erucic acid amide | 15,000 | Erucic acid amide | 1,000 | ⊚ | ⊚ | ⊚ | ⊚ | ○ | ○ |
| Ex. 8 | Fluorine | Ethylene bisoleic acid amide | 10,000 | Erucic acid amide | 1,000 | ⊚ | ⊚ | ⊚ | ⊚ | ○ | ○ |
| Ex. 9 | Phenoxy | Ethylene bis erucic acid amide | 10,000 | Erucic acid amide | 500 | ⊚ | ⊚ | ⊚ | ⊚ | ○ | ○ |
| Ex. 10 | Phenoxy | Ethylene bis erucic acid amide | 10,000 | Erucic acid amide | 4,500 | ⊚ | ⊚ | ⊚ | ⊚ | ○ | ○ |
| Comp. Ex. 2 | Phenoxy | Ethylene bis erucic acid amide | 10,000 | — | 0 | Δ | ⊚ | ⊚ | ⊚ | Δ | ○ |
| Comp. Ex. 3 | Phenoxy | — | 0 | — | 0 | X | ⊚ | ⊚ | X | Δ | Δ |

(EXPLANATION FOR THE MATTE COAT LAYER)
Phenoxy: mixed resin of phenoxy resin and urethane resin
Fluorine: copolymer of tetrafluoroethylene and vinyl acetate As it is clear from the results of the evaluations as shown in Table 1, the moldability can be improved by adding a lubricant to the matte coat layer and the inner sealant layer, and in both layers, the solvent resistance and the wear resistance improved, and the printability improved in the matte coat layer.

The present invention claims priority to Japanese Patent Application No. 2013-166872 filed on Aug. 9, 2013, the entire disclosure of which is incorporated herein by reference in its entirety.

The terms and descriptions used herein are used only for explanatory purposes and the present invention is not limited to them. The present invention allows various design-changes falling within the claimed scope of the present invention unless it deviates from the spirits of the invention.

INDUSTRIAL APPLICABILITY

The molding packaging material of the present invention can be preferably as a battery case of a lithium ion secondary battery, etc., and packaging materials for food products and/or pharmaceutical products.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. A molding packaging material comprising:
   an outer base material layer made of a heat resistant resin;
   an inner sealant layer;
   a metal foil layer arranged between the outer base material layer and the inner sealant layer; and
   a matte coat layer on an outer side of the outer base material layer, the outer side of the outer base material layer being opposite to a side of the outer base material layer facing the metal foil layer; wherein
   the matte coat layer includes a resin component, a solid fine particle, and a lubricant; and
   the inner sealant layer includes a thermoplastic resin and a lubricant;
   the resin component is at least one of a resin selected from the group consisting of an acrylic-based resin, an epoxy-based resin, an urethane-based resin, a polyolefin-based resin, a fluorine-based resin, and a phenoxy resin;
   a content rate of the lubricant in the matte coat layer is within a range of 5,000 ppm to 15,000 ppm; and
   the content rate of the lubricant in the matte coat layer is greater than a content rate of the lubricant in the inner sealant layer.

2. The molding packaging material as recited in claim 1, wherein the matte coat layer comprises a resin composition containing the resin component, the solid fine particle, and the lubricant.

3. The molding packaging material as recited in claim 1, wherein the resin component contained in the matte coat layer includes a main ingredient resin and a curing agent, the main ingredient resin containing a phenoxy resin and a urethane resin.

4. The molding packaging material as recited in claim 3, wherein a mass ratio of the phenoxy resin and the urethane resin in the main ingredient resin is a urethane resin 0.6-1.6 to a phenoxy resin 1.

5. The molding packaging material as recited in claim 1, wherein the lubricant contained in the matte coat layer is higher fatty acid amide.

6. The molding packaging material as recited in claim 1, wherein an average particle size of solid fine particles contained in the matte coat layer is 1-10 μm.

7. The molding packaging material as recited in claim 2, wherein a content rate of the solid fine particles in the resin composition constituting the matte coat layer is 0.1-60% by weight.

8. The molding packaging material as recited in claim 1, wherein the inner sealant layer comprises a resin composition containing the thermoplastic resin and the lubricant.

9. The molding packaging material as recited in claim 1, wherein the lubricant contained in the inner sealant layer is a higher fatty acid amide.

10. The molding packaging material as recited in claim 1, wherein the inner sealant layer further contains one or more solid fine particles selected from the group consisting of an acrylic resin, a silicone resin, a fluoric resin and silica.

11. A molded case formed by subjecting the molding packaging material as recited in claim 1 to deep drawing or bulging.

12. The molded case as recited in claim 11, wherein the molded case is used as a battery case.

13. The molding packaging material as recited in claim 1, wherein the content rate of the lubricant in the inner sealant layer is within a range of 500 ppm to 5,000 ppm.

* * * * *